United States Patent
Toffle et al.

(10) Patent No.: US 6,445,540 B1
(45) Date of Patent: Sep. 3, 2002

(54) LINEAR AIR BEARING WITH VACUUM STIFFENER

(75) Inventors: Mark A. Toffle, St. Louis Park; Brent M. Weichelt, Burnsville, both of MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/368,021

(22) Filed: Aug. 3, 1999

Related U.S. Application Data

(60) Provisional application No. 60/114,276, filed on Dec. 30, 1998.

(51) Int. Cl.[7] .............................................. G11B 5/596
(52) U.S. Cl. ..................................... 360/137; 360/77.02
(58) Field of Search ................................ 360/75, 77.02, 360/77.08, 97.01, 97.04, 98.01, 137

(56) References Cited

U.S. PATENT DOCUMENTS

| | | | |
|---|---|---|---|
| 3,943,529 A | 3/1976 | Feldman et al. | 346/108 |
| 4,980,783 A | 12/1990 | Moir et al. | 360/77.02 |
| 5,164,863 A | 11/1992 | Janz | 360/57 |
| 5,241,430 A | 8/1993 | Janz | 360/62 |
| 5,319,509 A * | 6/1994 | Michelson et al. | 360/77.03 |
| 5,568,337 A * | 10/1996 | Eguchi et al. | 360/78.11 |
| 5,610,777 A | 3/1997 | Dang et al. | 360/77.03 |
| 5,617,267 A | 4/1997 | Kawagoe et al. | 360/77.02 |
| 5,760,989 A * | 6/1998 | Colban | 360/75 |
| 5,763,966 A | 6/1998 | Hinds | 310/12 |
| 5,774,294 A | 6/1998 | Fioravanti | 360/75 |
| 5,796,542 A * | 8/1998 | Szeremeta | 360/77.02 |
| 5,883,703 A * | 3/1999 | Knirck et al. | 355/55 |
| 5,903,408 A | 5/1999 | Omi | 360/73.03 |
| 6,151,185 A * | 11/2000 | Ishizuka et al. | 360/78.04 |
| 6,188,535 B1 * | 2/2001 | Lemke et al. | 360/70 |
| 6,256,164 B1 * | 7/2001 | Choi | 360/97.01 |
| 6,266,869 B1 * | 7/2001 | Tracy et al. | 29/740 |

FOREIGN PATENT DOCUMENTS

| | | | |
|---|---|---|---|
| JP | 1-92986 | * | 4/1989 |
| JP | 319184 | | 1/1991 |
| JP | 5205414 | | 8/1993 |

OTHER PUBLICATIONS

"Vacuum Preloaded Air Bearings", New Way Machine Components, Inc. 2 Pgs, (Apr. 1999)

* cited by examiner

Primary Examiner—Brian E. Miller

(57) ABSTRACT

One aspect of the invention relates to an apparatus and method for loading and securing a disc drive head disk assembly (HDA) in a servo track writing apparatus. The HDA includes a base, a disc stack coupled to a spindle rotatably attached to the base by a spindle shaft, and an actuator assembly pivotally attached to the base at a pivot shaft. Attached to one end of the actuator assembly proximal the disc stack is at least one transducer for reading/writing information from/to the discs. In one embodiment, the apparatus comprises a vacuum block having an air bearing and a vacuum stiffener. The vacuum stiffener is selectively used simultaneously with the air bearing to preload the latter. Alternatively, the vacuum stiffener is used independently of the air bearing to vacuum couple the vacuum block to a guide surface. By allowing both vacuum preload and vacuum coupling, the vacuum block of the present invention provides precise HDA placement and retainment with little or no manual operator intervention. Further it reduces the complexity of the STW by eliminating the need to provide a separate preload device.

12 Claims, 12 Drawing Sheets

LINEAR AIR BEARING WITH VACUUM STIFFENER

RELATED APPLICATION

This application claims the benefit under 35 U.S.C. 119(e) of U.S. Provisional Application Serial No. 60/114,276, filed Dec. 30, 1998.

FIELD OF THE INVENTION

The present invention relates generally to the field of mass storage devices. More particularly, this invention relates to a combined linear bearing and vacuum stiffener for use with a high density disc drive servo track writing apparatus.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc drive housing, a disc that is rotated, an actuator assembly that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the transducer over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the transducers) can be positioned over any radial location along the rotating disc surface.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Transducers, in the form of read/write heads attached to the sliders, located on both sides of the storage disc, read and write information on the storage discs when the transducers are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize a multiplicity of concentric circular tracks, other discs have a continuous spiral forming a single track on one or both sides of the disc.

During manufacture, servo feedback information is encoded on the disk and subsequently used to accurately locate the transducer. The servo information is used to locate the actuator assembly/transducer head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disk assembly" (hereinafter HDA) stage. The HDA includes most of the mechanical drive components but does not typically include all the drive electronics. During the track writing process, the STW precisely locates the transducer heads relative to the disc surface and writes the servo information thereon. Accurate location of the transducer heads is necessary to ensure that the track definition remains concentric. If the servo track information is written eccentrically, the position of the transducer head during subsequent operation will require relatively large, constant radial adjustments in order to maintain placement over the track center. When the tracks are sufficiently eccentric, a significant portion of the disk surface must be allotted for track misregistration. Accordingly, overall track density is degraded and disc drive capacity is reduced.

In order to ensure proper writing of servo information, STWs utilize an external, closed loop positioning system that precisely positions the transducer head during servo track writing. The positioning system comprises a contact member that engages the actuator assembly, a position indicator which indicates the position of the contact member, and a displacing mechanism which repositions the contact member based on feedback from the position indicator. To ensure accurate positioning, various position indicators are used (e.g., mechanical, capacitive, and optical transducers to name a few). The STW further includes the required circuitry for writing the servo information to the disc surface via the transducer heads.

As demand for higher capacity drives grows, manufacturers are constantly seeking to increase drive capacity by increasing track density. That is, by increasing the density or "tracks per inch" (TPI), a greater number of discreet tracks can be encoded on a given disc surface. However, higher track density requires more efficient use of the disc surface. Accordingly, track misregistration due to eccentricities in track formation must be minimized in order to maximize TPI (and thus disc capacity).

While it is advantageous to maintain substantial concentricity during the servo track writing process, many factors adversely impact the STW's ability to write servo information concentrically. For instance, induced resonance in the STW itself can adversely affect the track writing operation. Further, vibrations in the spindle or actuator components (e.g., imperfect bearings) may also produce nonrepeatable track writing errors. Still yet another problem with current STWs is oscillations in the HDA itself (i.e., independent deflection of the actuator and spindle relative to the STW). The present invention is directed to reducing these problems, especially the effects of component deflection, and the remainder of this discussion will focus on the same.

Most current STWs support the HDA by engaging a plurality of points on the external drive housing. When the HDA is so engaged, the spindle and actuator are restrained only by the internal structure of the HDA (i.e., the drive housing). Still other HDAs fasten the drive cover to the pivot shaft and a spindle shaft to provide additional support thereto. However, these STW/HDA configurations still produce drives with limited track densities not because of the STW's positioning accuracy but rather because of the non-repeatable deflection and vibration of the HDA components.

Another problem encountered in designing the STW of the present invention was how to ensure that the HDA could be repeatably and correctly loaded therein. If improperly loaded, errors in the servo track writing process may occur. While utilizing a technician to monitor and manually guide the HDA during the loading process is possible, it is also time consuming and prone to operator error. Accordingly, an apparatus that can precisely and repeatably place the HDA within the STW without operator input is desirable.

Yet another problem is how to immobilize the HDA once it is properly loaded within the STW. While various mechanical clamping systems are known, some may adversely affect the precise position of the HDA. Others may apply an uneven clamp load which can adversely affect the servo track writing process. A clamping system that may evenly and adequately secure the HDA without adversely affecting its location is therefore desirable.

Accordingly, what is needed is an apparatus and method for use with an STW that minimizes relative deflection between the components of the HDA during the track writing process. In particular, what is needed is a way to reduce HDA component deflection sufficiently to allow greater track densities to be formed on a given disk surface. What is further needed is an improved apparatus for loading and securing the HDA in place within the STW. The present invention addresses these needs.

SUMMARY OF THE INVENTION

In one embodiment, a vacuum block for use with a guide surface is provided wherein the vacuum block includes a vacuum stiffener having a recessed portion adapted to fluidly coupled to a vacuum source. The vacuum block further includes an air bearing extending around a periphery of the recessed portion wherein the air bearing is adapted to fluidly couple to a pressurized air source. In a first configuration, the vacuum source and the pressurized air source are activated simultaneously to elevate the vacuum block from the guide surface on an air film. In this configuration, the air bearing is preloaded by the vacuum stiffener. In a second configuration, the pressurized air source is deactivated to permit the vacuum stiffener to vacuum couple the vacuum block to the guide surface.

In another embodiment, a method for displacing and securing a vacuum block relative to a guide surface is disclosed. The method includes providing a vacuum block wherein the vacuum block includes a vacuum stiffener. The vacuum stiffener has a recessed portion adapted to fluidly coupled to a vacuum source. Also provided is an air bearing surface extending around a periphery of the recessed portion, wherein the air bearing surface is adapted to fluidly couple to a pressurized air source. The method further includes the step of activating the pressurized air source wherein a bearing force is produced between the guide surface and the air bearing surface such that an air film develops therebetween. The vacuum source is activated to a first vacuum pressure wherein the vacuum source provides a preload force opposite the bearing force. Thereafter, the pressurized air source is deactivated and the vacuum source is maintained to vacuum-couple the vacuum block to the guide surface in a predetermined location.

In yet another embodiment, a servo track writing apparatus for securing a head disc assembly (HDA) during a servo track writing process is provided. The apparatus includes a base, a fixed block assembly attached to the base and a basket assembly opposing the fixed block assembly. The basket assembly further includes a movable carriage having a basket adapted to receive the HDA, and a vacuum block adapted to selectively permit both precise movement of the movable carriage relative to the base and to permit vacuum coupling of the movable carriage thereto. The apparatus also includes a displacing device adapted for moving the carriage toward the fixed block assembly and a loading device adapted for loading the carriage against the fixed block assembly.

In still yet another embodiment, an apparatus for precisely locating a moving member relative to a guide surface in a servo track writer (STW) is provided. The apparatus includes an air bearing adapted to generate an air film between the moving member and the guide surface, and a device for stiffening the air bearing.

Advantageously, the present invention provides an STW having an air bearing and vacuum stiffener that permits precise movement of the vacuum block relative to a guide surface without the need for a second, opposing air bearing or similar preloading device. In addition, by operating the vacuum stiffener independently from the air bearing, the vacuum stiffener may also be used to vacuum couple the vacuum block to the guide surface, eliminating the need for a separate clamping device. Accordingly, the HDA may be loaded into and secured within the STW without manual operator intervention. The result is more accurate HDA placement and, ultimately, more efficient servo track writing.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
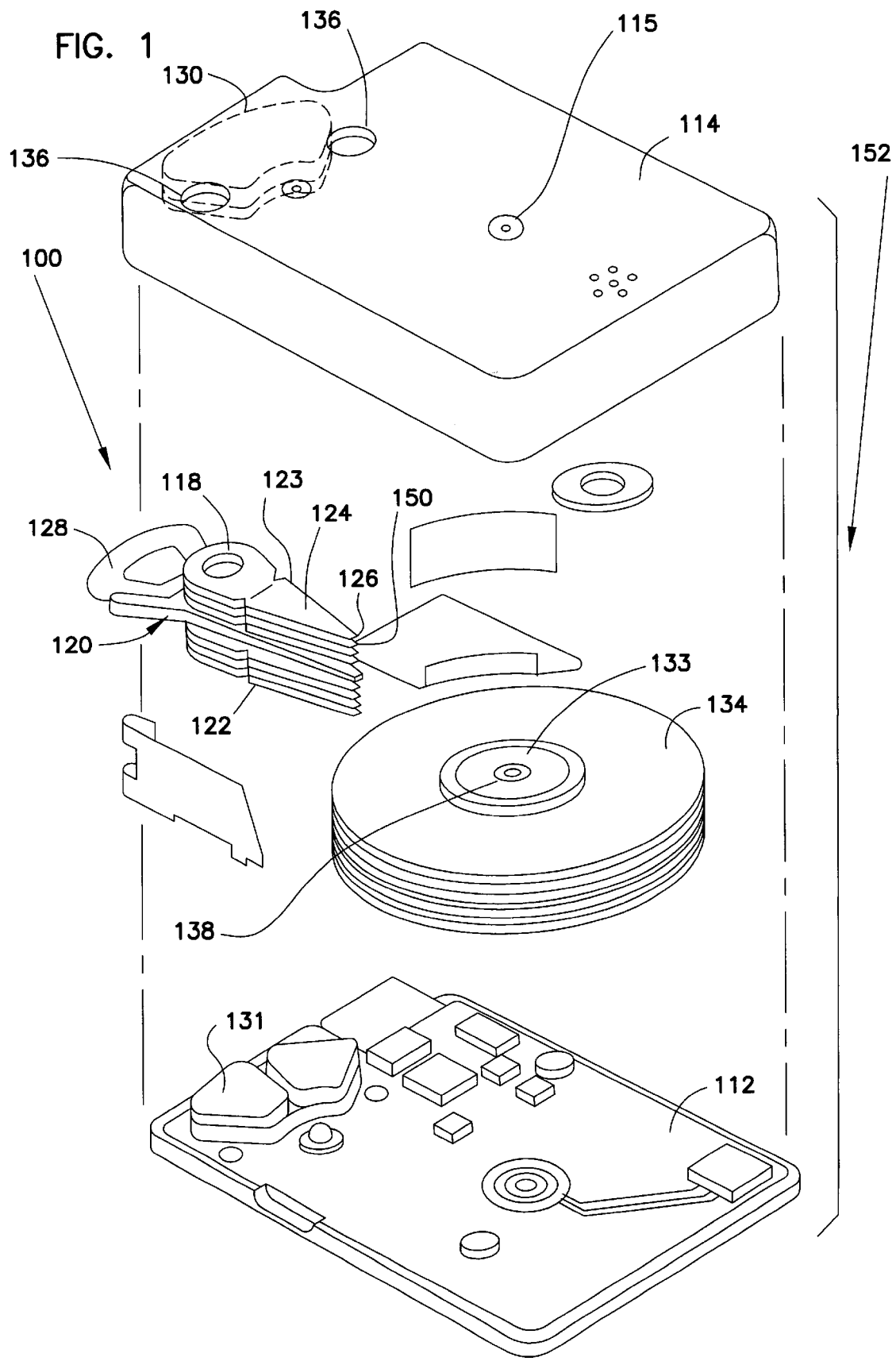
FIG. 1 is an exploded view of a generic disc drive with a multiple disc stack.

The invention described in this application is useful with most all mechanical configurations of disc drives utilizing either rotary or linear actuation. FIG. 1 is an exploded view of one type of a disc drive 100 having a rotary actuator. The disc drive 100 includes a housing or base 112, and a cover 114. The housing 112 and cover 114 form a disc enclosure. Rotatably attached to the housing 112 on an actuator pivot shaft 118 is an actuator assembly 120. The actuator assembly 120 includes a comb-like structure 122 having a plurality of arms 123. Attached to the separate arms 123 on the comb 122 are load beams or load springs 124. Load beams or load springs are also referred to as suspensions. Attached at the end of each load spring 124 is a slider 126 which carries a magnetic transducer head 150. The slider 126 with the transducer 150 form what is frequently called the head. It should be noted that many sliders have one transducer 150 and that is what is shown in the figures. However, this invention is equally applicable to sliders having more than one transducer, such as what is referred to as an MR or magneto resistive head in which one transducer 150 is generally used for reading and another is generally used for writing.

On the end of the actuator assembly 120 opposite the load springs 124 and the sliders 126 is a voice coil 128. Located above and below the voice coil 128 is a first magnet 130 and a second magnet 131. As shown in FIG. 1, the first magnet 130 is associated with the cover 114 while the second magnet is adjacent the housing 112. The first and second magnets 130, 131, and the voice coil 128 are the key components of a voice coil motor which applies a force to the actuator assembly 120 to rotate it about the actuator pivot shaft 118. Also mounted to the housing 112 is a spindle motor (not shown). The spindle motor includes a rotating portion called the spindle hub 133. In this particular disc drive, the spindle motor is within the hub. In FIG. 1, a number of discs 134 are attached to the spindle hub 133. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or, alternatively, under the hub.

The spindle hub 133, in one embodiment, rotates about a stationary spindle shaft 138 which has a first end retained in the housing 112 and a second end adjacent to the cover 114. When the discs are spinning, the spindle shaft 138 remains stationary. The spindle shaft 138 includes a female thread on the second end which permits coupling of the second end to the cover 114. The pivot shaft 118 is of a similar construction in that it is also stationary and has a first end (in the housing 112) and a second end (adjacent the cover 114) with a female thread located on the latter (see FIG. 13). The purpose of these stationary shafts will become apparent in the following discussion.

The disk drive 100 includes the mechanical components discussed above as well as various electronic components such as a printed circuit board (not shown) typically attached to the lower (as viewed in FIG. 1) side of the housing 112. Without the circuit board and other electronics, the disc drive is often referred to as a head disc assembly or HDA 152. Stated alternatively, the mechanical components —including the drive housing 112, cover 114, actuator assembly 120, pivot shaft 118, arms 123, transducer heads 150, spindle hub 133, spindle shaft 138, and discs 134 among others—generally define the HDA 152. The HDA is a convenient subassembly for completing various manufacturing processes including servo track writing. For instance, the HDA provides physical access to the voice coil 128 during manufacture via apertures 136 but can thereafter be sealed (hermetically if necessary) to ensure that the internal components remain substantially contaminant-free. Near the end of production, the drive electronics are assembled to the HDA 152 to produce the disc drive 100.

Generally speaking, the present invention relates to an improved method and apparatus for loading and holding an HDA during the servo track writing process. In particular, the invention is directed to a method and apparatus of restraining the pivot shaft 118 and spindle shaft 138 between two sets of opposing clamp points located on relatively stiff, opposing clamp members. By restraining the shafts from all but rotational motion, eccentric track formation resulting from mechanical oscillations, bearing imperfections, and overall deflection of the HDA components is substantially reduced. Accordingly, the percentage of the disc surface required for track misregistration is minimized, yielding greater track densities and ultimately, a higher storage capacity for a given disc size.

Figure 2:
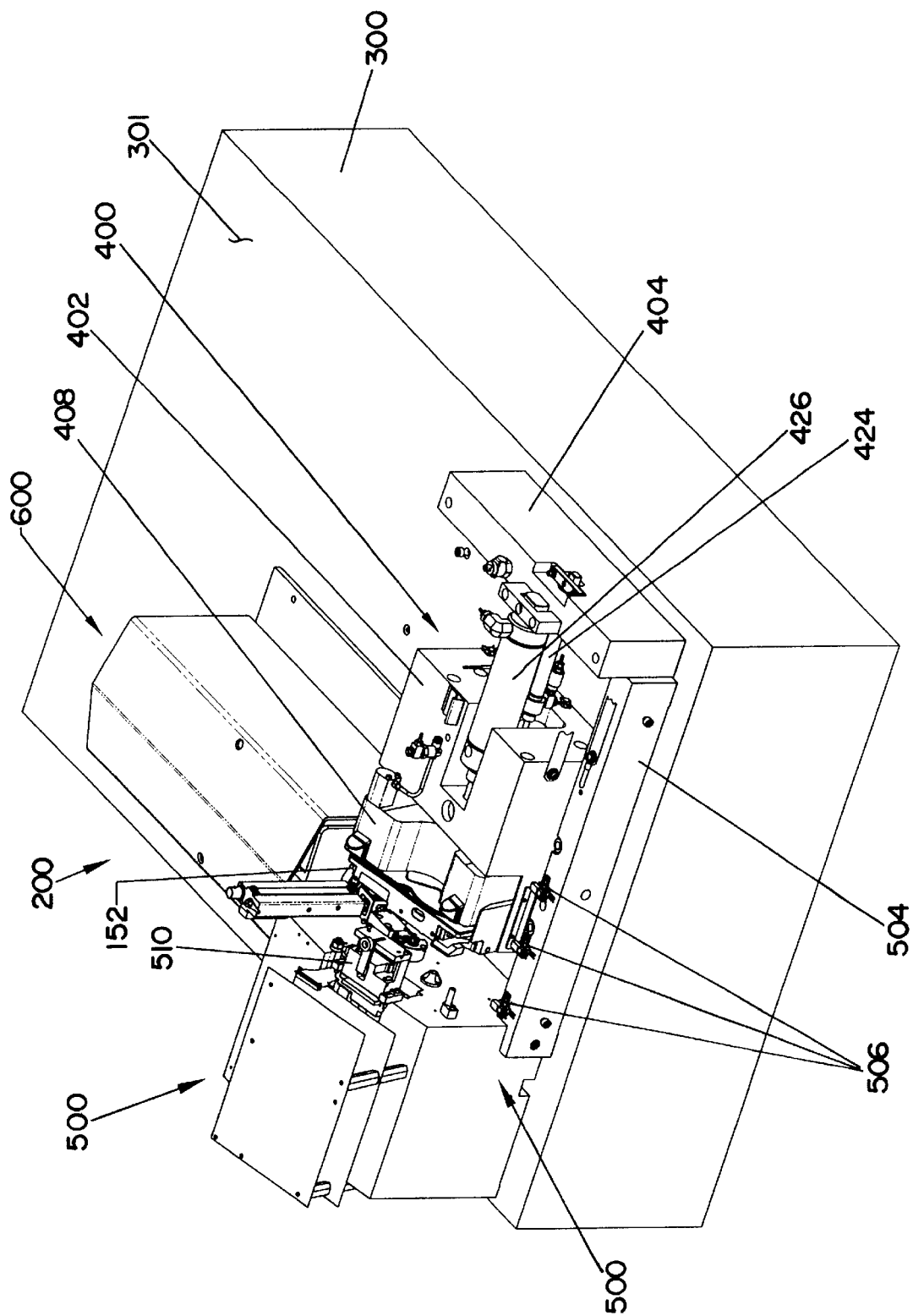
FIG. 2 is a perspective view of a servo track writing apparatus according to one exemplary embodiment of the present invention, the apparatus shown in the "closed" or operating position.
Figure 3:
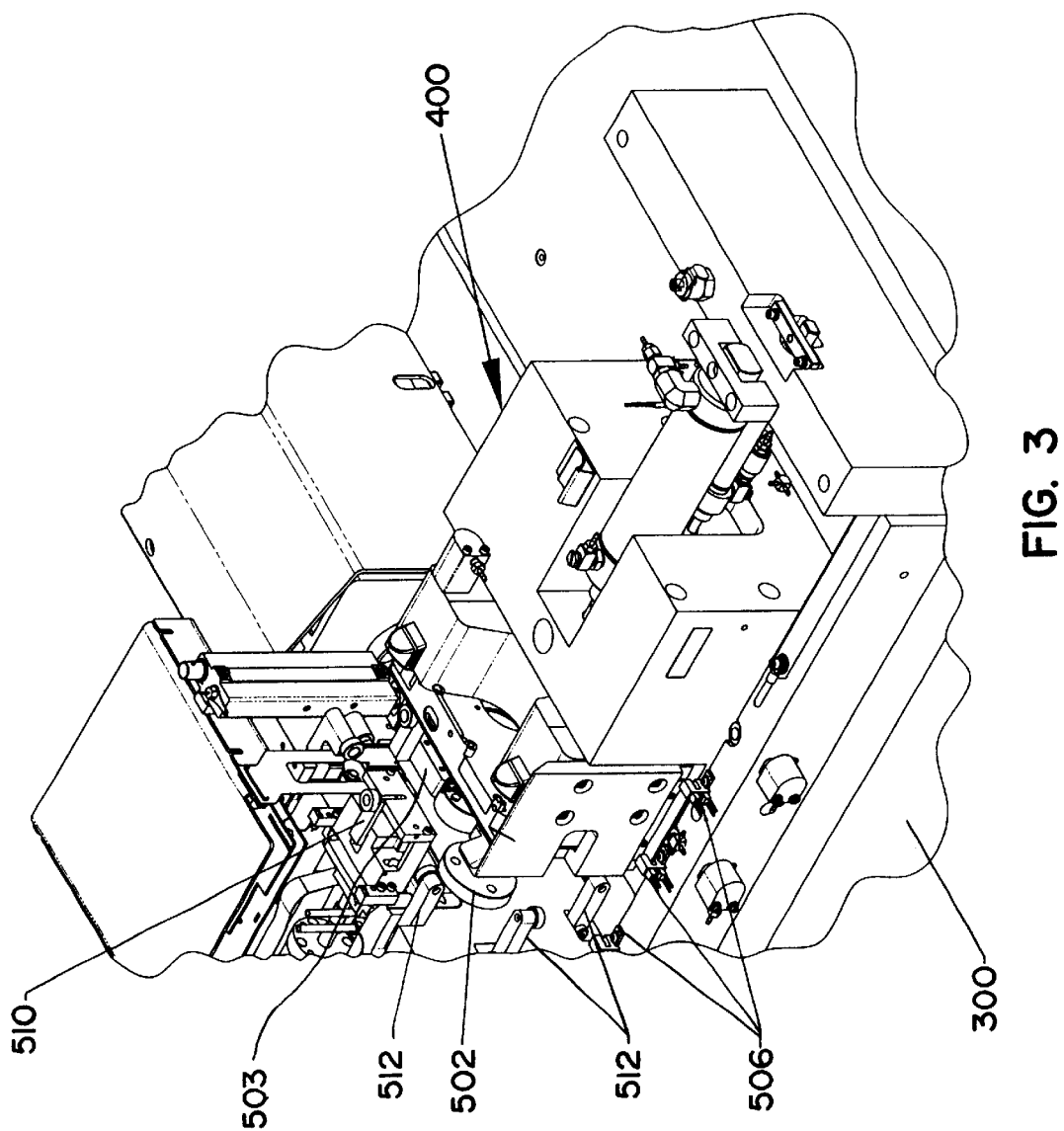
FIG. 3 is a partial perspective view of the apparatus of FIG. 2 shown in the "open" position.

Referring now to FIG. 2, a servo track writing machine or apparatus (hereinafter STW) 200 according to one embodiment of the invention is shown. The STW is used to write servo information to the individual discs 134 (see FIG. 1) of the HDA 152. The STW is shown in a closed or writing position with the HDA 152 installed horizontally therein (i.e., the spindle shaft 138 and pivot shaft 118 are horizontal). FIG. 3 shows the HDA in an open or loading position with the HDA removed.

The STW 200 illustrated in the figures includes numerous aspects that are not central to the invention. For example, a clocking mechanism 510 (see FIG. 3) is provided to indicate the rotational position of the discs within the HDA during track writing. Since this and other track-writing aspects of the illustrated STW are not central to an understanding of the invention, they are not described in detail herein.

Figure 4:
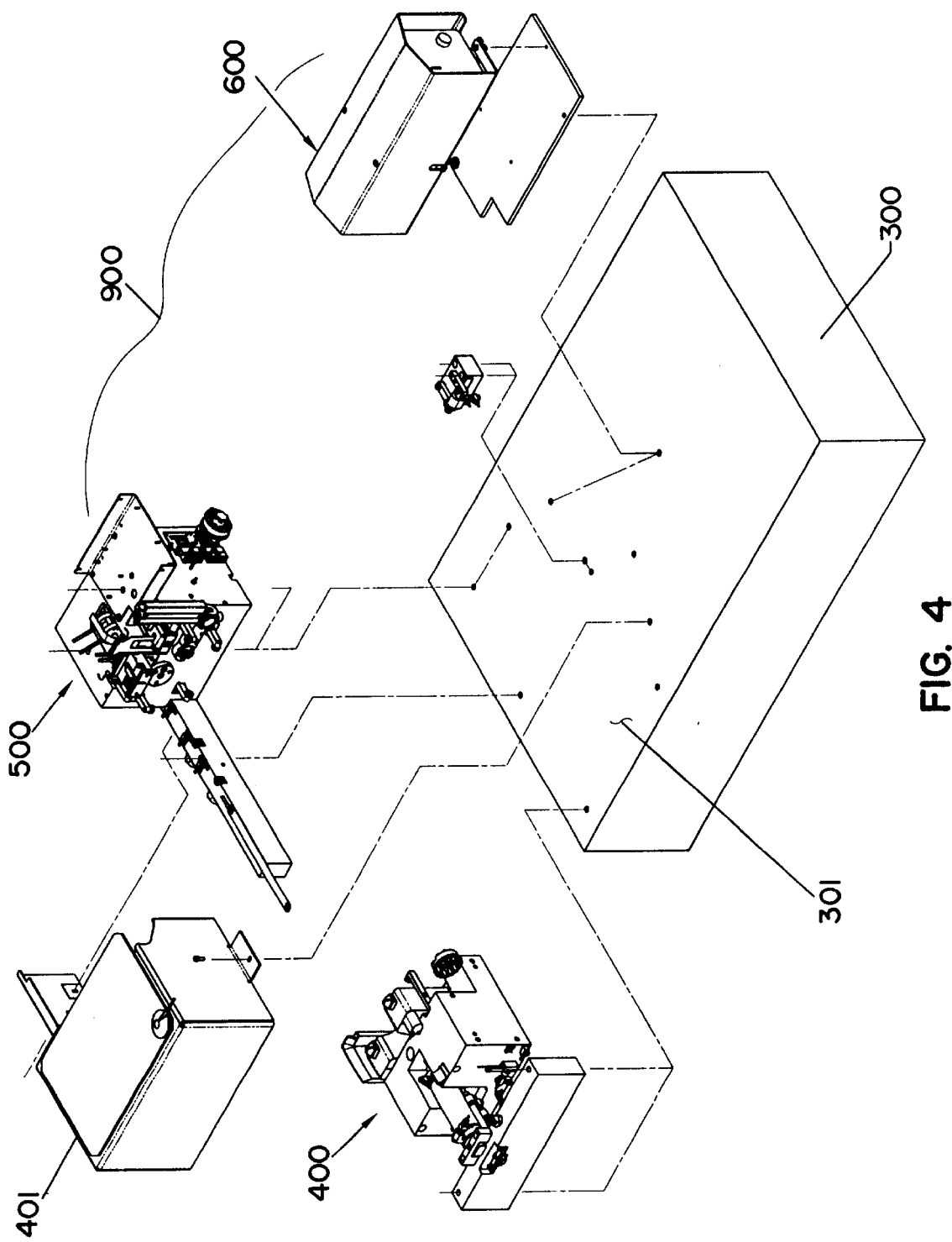
FIG. 4 is a an exploded view of the apparatus of FIG. 2.

Referring now to FIG. 4, the STW 200, in one embodiment, includes a base 300, a moving block or basket assembly 400, a fixed block assembly 500, and a servo information writing system 900 which, in one embodiment, includes a laser assembly 600 and other components located within the fixed block assembly 500. A cover 401 for covering a portion of the basket assembly 400 is also shown. Each of these items is described in detail below.

BASE

The base 300 is, in one embodiment, formed from granite, diabase, or a similar dimensionally stable material which is machined to precise tolerances. As shown in FIG. 4, the base 300 has a plurality of threaded holes corresponding to mounting patterns provided on the various assemblies. Fasteners (not shown) couple the various assemblies 400, 500, and 600 to the base. The base surface 301 provides a guide surface or datum for locating the assemblies relative to one another.

Basket Assembly

Figure 5:
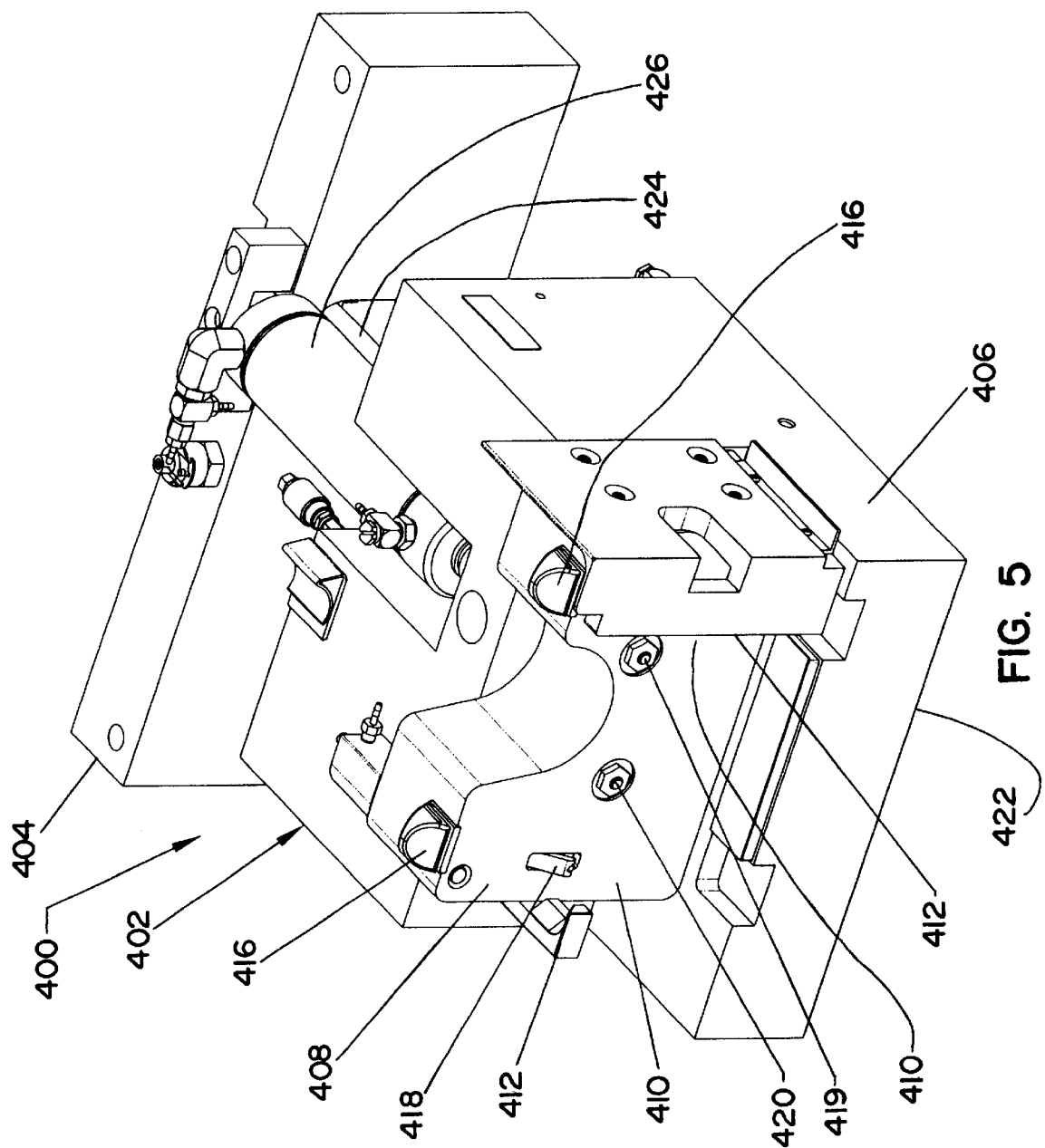
FIG. 5 is an enlarged, partial perspective view of a basket assembly according to one embodiment of the invention.
Figure 6:
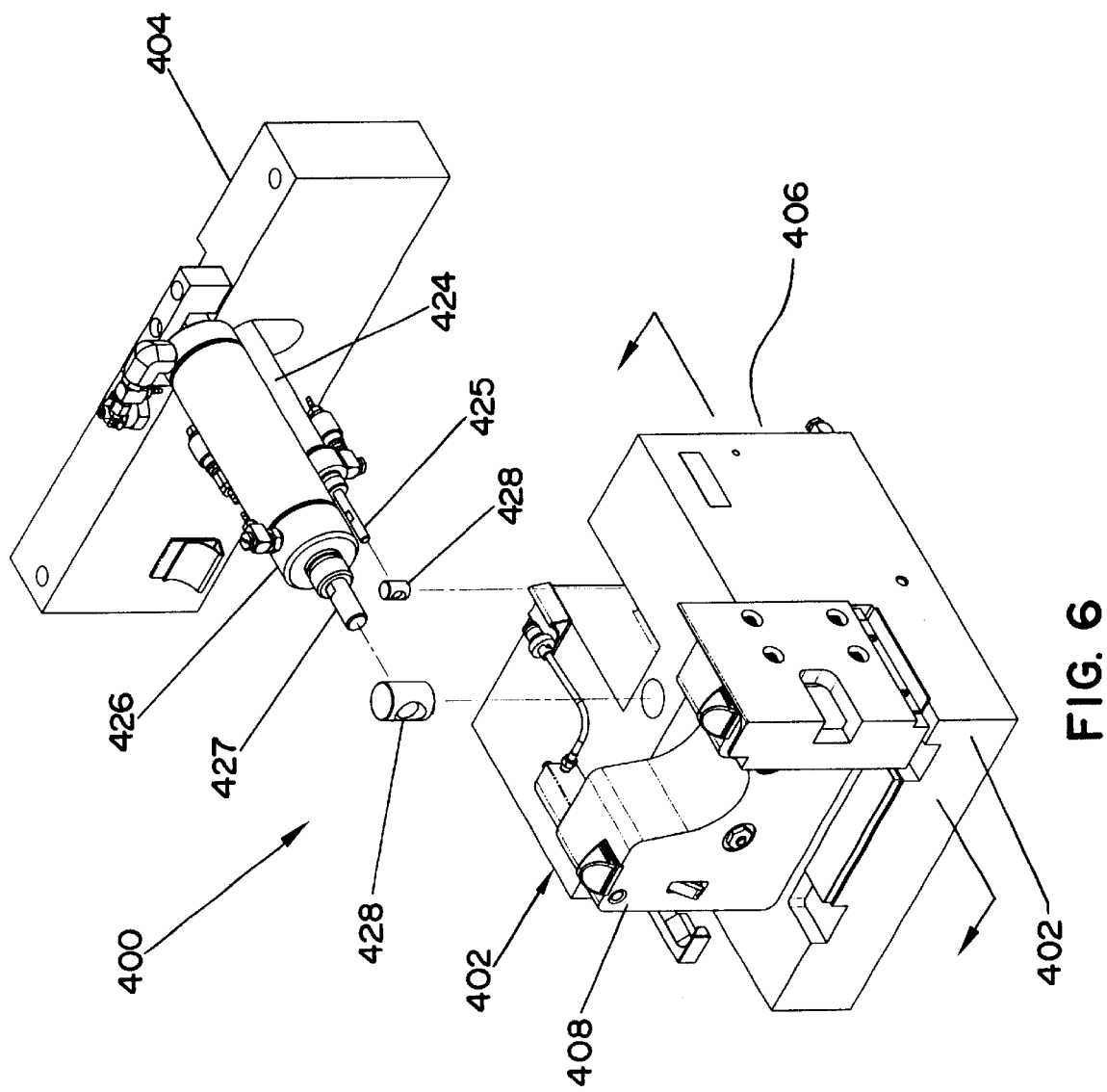
FIG. 6 is an exploded view of the basket assembly of FIG. 5.

Coupled to one edge of the base 300 is the basket assembly 400 which is more clearly shown in FIGS. 5 and 6. The basket assembly 400 comprises a first, moving clamp member which is hereinafter referred to as the carriage 402, and a fixed portion or backing block 404. The carriage 402 includes a vacuum block 406 and a damper assembly 408. The vacuum block 406 further comprises a linear air bearing and vacuum stiffener as further discussed below. The damper assembly 408 defines a receptacle or basket 410 for receiving the HDA 152 as shown in FIG. 2. The sides of the basket 410 include a primary or first guide module 412 and a secondary guide module 414. The face of the basket 410 is defined by the damper assembly 408. The damper assembly still further includes HDA lead-in guides 416 to assist in loading the HDA, and biased preload buttons 418 which bias the HDA against the guide modules 412, 414. The damper assembly further comprises contact points 419, 420 which engage the HDA 152 when the latter is installed. The first contact point 419 contacts the cover 114 where it couples to the spindle shaft 138 while a second contact point 420 contacts the cover 114 where the latter couples to the pivot shaft 118. One or more additional contact points (not shown) may be provided to engage another stationary portion of the HDA housing 112 to better indicate or constrain the drive within the basket.

In one embodiment, the damper assembly 408 is made of aluminum. However, other materials having different damping characteristics are also possible within the scope of the invention. For instance, in another embodiment, the damper assembly comprises stainless steel impregnated with plastic. Other materials that provide particular damping capabilities are also possible.

The vacuum block 406 comprises a slide or air bearing surface 422 which slides along the surface 301 of the base 300 (see FIG. 2). The block 406 is selectively displaced along the base 300 under power of one or more linear actuators. In one embodiment, the actuators are pneumatic cylinders which receive pressurized air from a pressurized air source 431 (shown diagrammatically in FIG. 7) to extend and retract an actuator rod. While shown and described as pneumatic cylinders other linear actuation devices are also possible. For example, linear ball screws may also be used without departing from the scope of the invention.

In the exemplary embodiment shown in the figures, the basket assembly 400 includes a first pneumatic cylinder 424 (see FIG. 6) having a first extension rod 425 which displaces the carriage 402, and a second pneumatic cylinder 426 having a second extension rod 427 which applies a preload force to the carriage. While the particular design of the pneumatic cylinders is not central to the invention, in one embodiment the pneumatic cylinder 424 is a BIMBA Manufacturing model 013-DPB-CT while the pneumatic cylinder 426 is a BIMBA Manufacturing model 173-DP-CT. However, STWs using other cylinders or other displacing and loading devices are equally within the scope of the invention. Furthermore, only one or, alternatively, more than two actuators may be used to accomplish both displacement and loading.

The actuators 424, 426 are pivotally attached to the carriage 402 at rod end pivots 428 (see FIG. 6). The opposite or base end of the actuators 424, 426 attaches to the backing block 404 which is, in turn, fastened or otherwise coupled to the base 300. Like the rod ends, the base ends of the actuators 424, 426 are pivotally coupled to the backing block 404. By allowing the actuators to pivot at both ends, the direction of the carriage 404 is generally unconstrained by the actuators during extension and retraction. Further, by having pivoting ends, the actuators experience little or no side loading during operation.

Linear Air Bearing and Vacuum System

Figure 7:
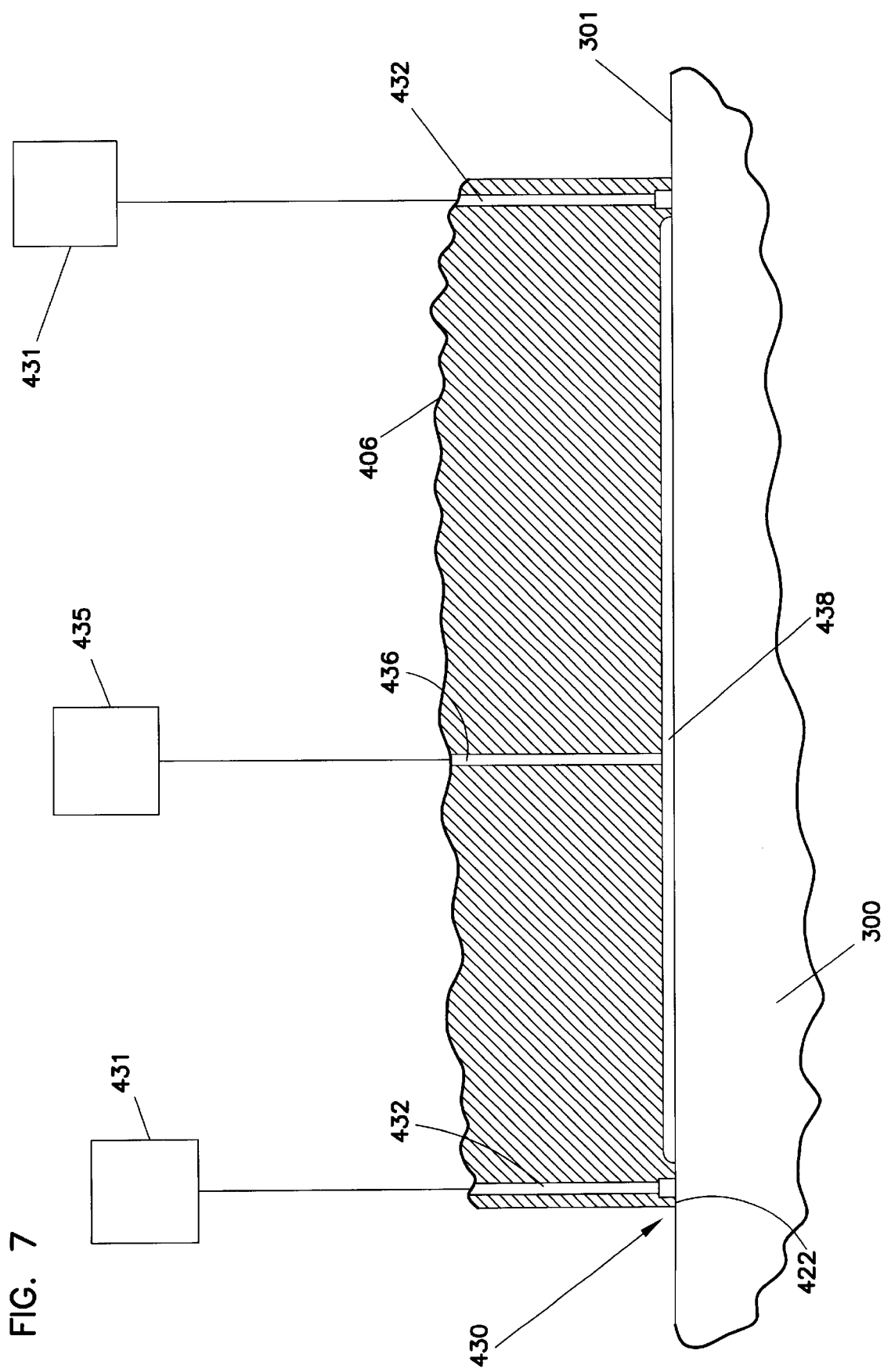
FIG. 7 is a diagrammatic section view of a vacuum block assembly according to one embodiment of the invention.

Pressurized air is provided to the basket assembly 400 to provide the actuation force to the pneumatic cylinders 424, 426, thus permitting the cylinders to extend and retract and move the carriage 402. Pressurized air is also provided to the slide surface 422 from the pressurized air source 431 as shown in FIG. 7 to form an air bearing 430. The air bearing 430 comprises a plurality of ports or orifices 432 located along a perimeter of the slide surface 422 of the vacuum block 406. When pressurized air is delivered, an air film 439 (see FIG. 15) having a thickness 441 develops between the surface 422 and the base surface 301. This air film permits relatively friction-free travel of the vacuum block 406, and thus the carriage 402, along the base 300. When the block 406 has been repositioned, flow to the orifices 432 is terminated and the block 406 comes into contact with the base surface 301.

In addition to pressurized air, stiffening means, which in one embodiment is a vacuum stiffener 437 having a vacuum source 435, is also provided. The vacuum stiffener 437 comprises, the vacuum source 435 coupled to the vacuum block 406 at a vacuum port or orifice 436 (see FIG. 7). The vacuum orifice 436 is fluidly coupled to a recessed portion 438 of the block 406. The vacuum stiffener serves multiple purposes. First, the vacuum stiffener is capable of selectively vacuum coupling the vacuum block 406 to the base 300. Vacuum coupling occurs when flow of pressurized air is discontinued to the orifices 432 and the vacuum source 435 is activated. Here, the surface 422 sits flush to the base surface 301 and the vacuum pressure couples the vacuum block 406 to the base 300. In one embodiment, the vacuum source has an adjustable vacuum pressure, providing at least two different vacuum pressure settings for reasons that will become apparent below.

The vacuum stiffener is also used in conjunction with the air bearing to stiffen the latter. While air bearings are extremely effective at eliminating friction, they typically require an opposing air bearing or similar device to apply an opposing load or preload. Without the preload, the air bearing is unstable and has an inconsistent flying height due to the compressibility of the air film. Such inconsistent flying heights result in mis-alignment as well as random and unintended contact between the bearing surfaces (surfaces 422 and 301). To stiffen the air bearing and maintain a consistent flying height between the vacuum block 406 and the base surface 301, the vacuum stiffener 437 is, in one embodiment, used simultaneously with the air bearing 430. The counteracting force of the vacuum stiffener provides the preloading force necessary to stabilize the air bearing 430. By utilizing the vacuum stiffener, the STW does not require an additional air bearing or other preload device. Thus, space and cost savings are realized.

The air bearing with the vacuum stiffener as generally illustrated in 5 FIG. 7 permits precise movement of the carriage 402, and thus the HDA 152, between the closed position (see FIG. 2) and the open position (see FIG. 3). This precise movement ensures that the HDA is in registration with the STW when the latter is placed in the closed position. Further, this accurate positioning is accomplished without the need for manual operator intervention.

Figure 15:
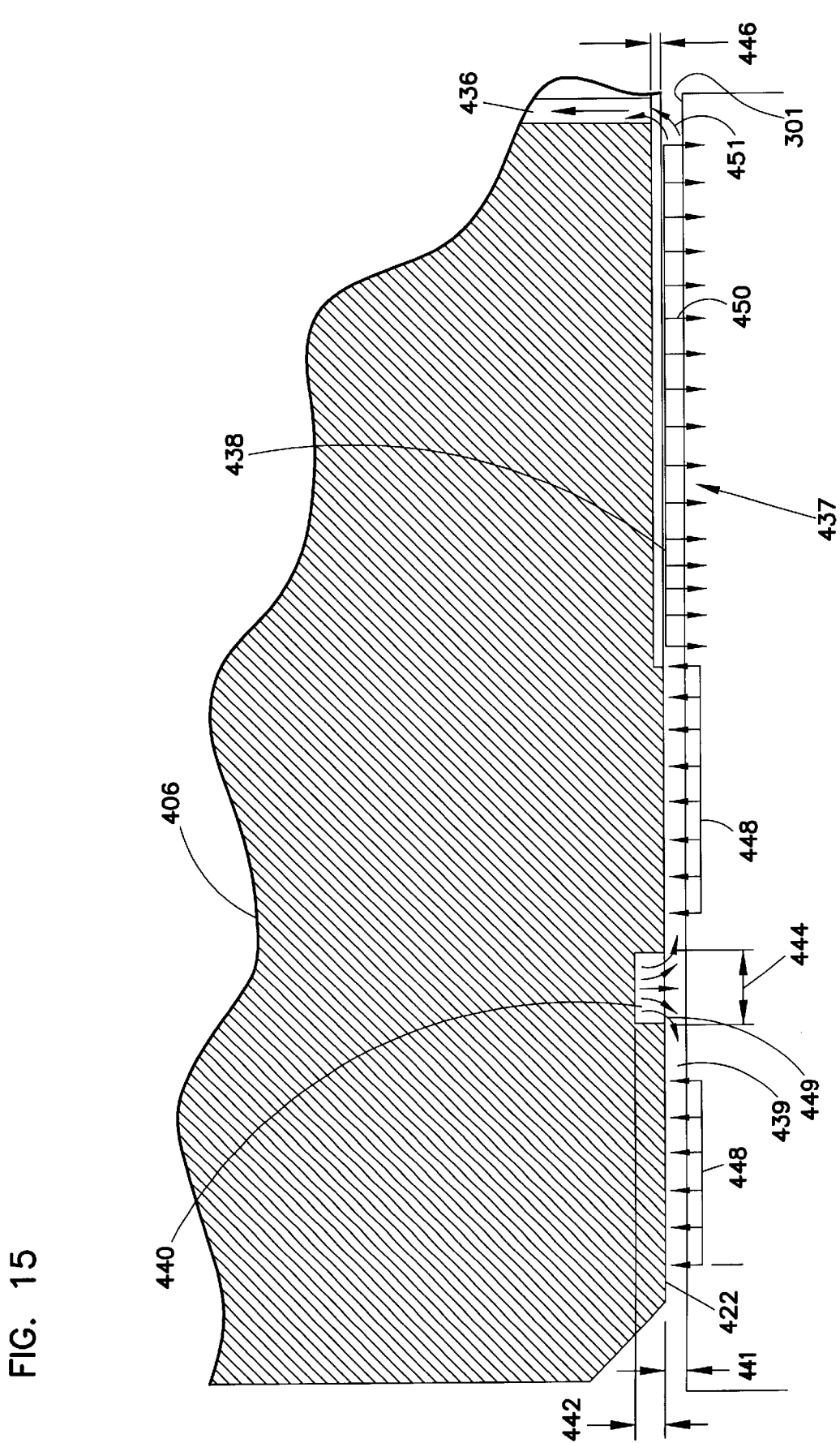
FIG. 15 is an enlarged, partial section view of the vacuum block of FIG. 7.

Referring now to FIG. 15, a more detailed view of the vacuum block 406 is shown. The block includes the air bearing surface 422 which has an air distribution channel 440 fed by the port 432 (not shown in this view). To maximize the stability and balance of the vacuum block 406 and to provide a large resistance to tilting forces during motion, the air bearing surface 422 extends around the outside edge or periphery of the block 406. A lifting or bearing force 448 is applied to the block 406 at the surface 422 when the pressurized air source 431 (see FIG. 7) is activated. The lifting force 448 is produced by pressurized air 449 (delivered from the pressurized air source 431) as it escapes from the channel 440 to atmosphere. While shown diagrammatically in this view, the lifting force 448 is generally applied across the entire bearing surface 422.

Also shown in FIG. 15 is the recessed portion 438 which is located inboard of the air bearing surface 422. When the vacuum source 435 is activated, a preload force 450 opposite the bearing force 448 is developed by the evacuation of air 451 through the port 436. While shown diagrammatically, the preload force 450 is also generally applied across the entire recessed portion 438.

The location of the air bearing surface 422 and the recessed portion 438 are selected to maximize bearing stability. However, vacuum blocks of other configurations (e.g., vacuum force applied at perimeter as well) are also possible without departing from the scope of the invention.

While various embodiments are possible within the scope of the invention, the embodiment shown herein utilizes an air distribution channel 440 having a depth 442 of approximately 0.020 inches (in) or 0.508 millimeters (mm) and a width 444 of approximately 0.050 in (1.270 mm). The recessed portion has a depth 446 of approximately 0.005 in (0.127 mm). This produces a ratio of channel depth 442 to recess depth 446 of approximately four. However, other ratios are also within the scope of the invention. While other sizes and configurations are contemplated, these dimensions provide a stable and consistent vacuum block 406 that travels over the surface 301 at a constant fly height of approximately 0.002 in (0.051 mm) when the air bearing supply pressure is set to approximately 85 poundforce per square inch (psi), which equates to approximately 586 kilopascals (kPa), and the vacuum pressure is set to approximately 1 inch of mercury (in Hg) which equates to approximately 25.4 millimeters of mercury (mm Hg). By maintaining a precise flying height, an HDA can be loaded into the basket 410 and the STW closed without risk of misalignment.

When the vacuum block 406 is moved to its predetermined, desired location, the air source 431 is deactivated or de-coupled from the ports 432, allowing the air film to dissipate and the block 406 to drop to the surface 301. With the vacuum source 435 still activated, the recessed portion 438 is evacuated and a vacuum seal is formed between the block 406 and the surface 301. The magnitude of the vacuum pressure may be adjusted to permit incremental movements of the block relative to the surface 301. Alternatively, the vacuum pressure may be elevated to effectively vacuum couple or clamp the block to the surface 301 as further described below. In one embodiment, the vacuum pressure is adjustable from zero to approximately 28 in Hg (711 mm Hg).

Accordingly, the air bearing and vacuum stiffener of the present invention permit precise and repeatable location of the HDA within the STW. In addition, they permit vacuum-coupling of the block 406 to the surface 301 without adversely affecting the general location of the HDA relative to the STW. This is accomplished without the need for manual intervention. In addition, by utilizing the vacuum source 436 to both vacuum clamp the block to the surface as well as to preload the air bearing, the complexity of the STW is reduced (i.e., opposing air bearing and separate clamp are eliminated).

Fixed Block Assembly

Figure 8:
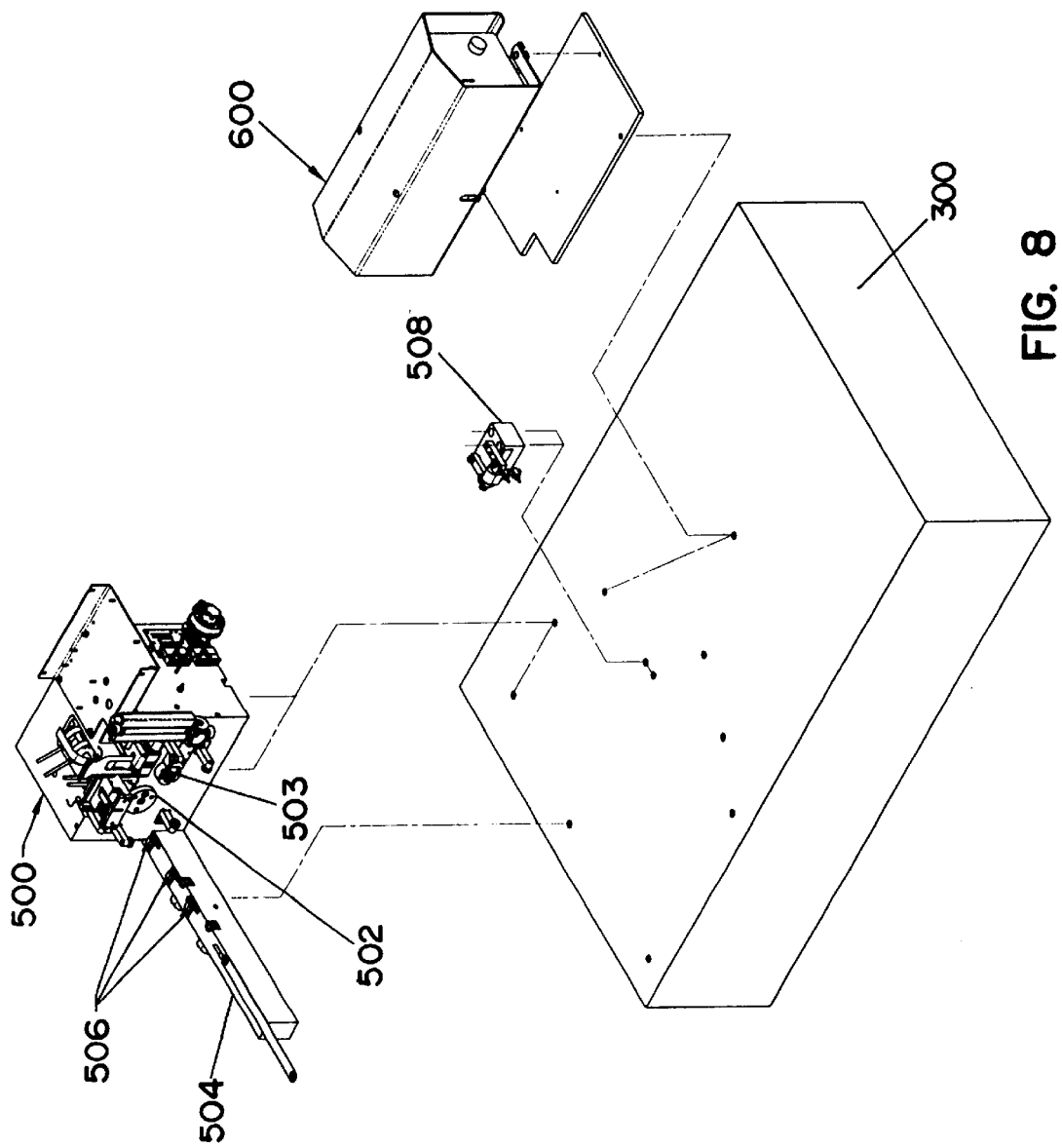
FIG. 8 is an exploded view illustrating a fixed block assembly in accordance with one embodiment of the invention.
Figure 9:
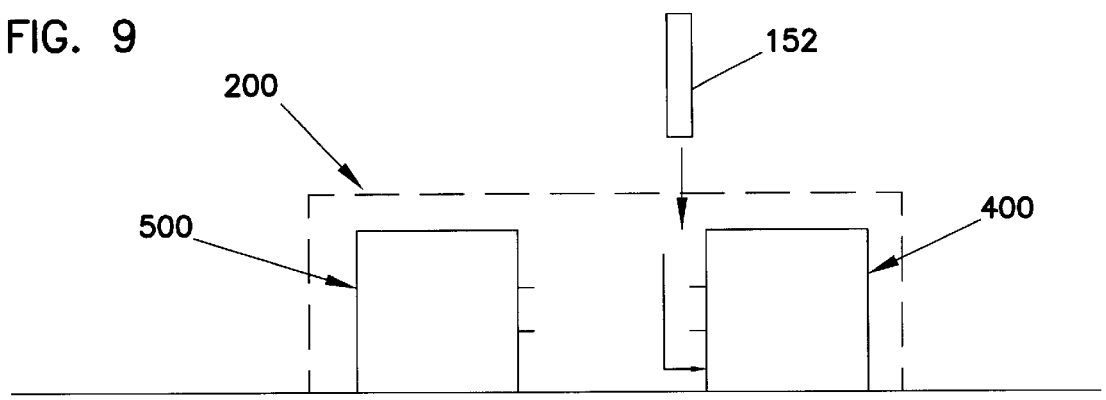
FIG. 9 is a diagrammatic view illustrating insertion of the HDA into the STW in accordance with one embodiment of the invention.

Referring now to FIG. 8, mounted opposite the basket assembly 400 is a second, fixed clamp member hereinafter referred to as the fixed block assembly 500. The fixed block assembly is adapted to engage the HDA 152 with third and fourth contact points 502, 503 (see FIG. 3) respectively opposite the first and second contact points 419, 420. Accordingly, when the STW is closed, the HDA 152 is "sandwiched" between the contact points 419, 420 (see FIG. 5) and 502, 503 (see FIG. 3) so that the ends of the spindle shaft 138 and the pivot shaft 118 are restrained. That is, together the contact points 419, 420, 502, and 503 define a means for engaging the HDA 152 by operatively contacting the ends of the spindle shaft 138 and the pivot shaft 118. While the contact points shown herein engage the HDA as illustrated, any other engaging means that contacts the HDA in the vicinity of the spindle shaft and pivot shaft is also within the scope of the invention. It is noted that the contact points operatively engage the spindle shaft and pivot shaft ends without restriction rotation or pivoting of the spindle 133 or the actuator assembly 120.

The fixed block assembly 500 further includes a guide rail 504 which extends from one side of the assembly 500 towards the basket assembly 400. The guide rail 504 is fastened to the base 300 and includes a series of guiding devices which, in one embodiment, are rollers 506 (visible in FIGS. 3 and 8) that are selectively extended and retracted to guide the carriage 402 and constrain lateral motion during movement of the carriage 402. Mounted opposite the guide rail 504 is a side loading assembly 508 which is used to selectively load the carriage 402 against the guide rollers 506.

Still referring to FIG. 8, the fixed block assembly 500 is, in one embodiment, coupled to a laser assembly 600. The fixed block assembly 500 and the laser assembly 600 incorporate various portions of the servo track writing system 900. The system includes, among other items, those components needed to physically and electronically interact with the HDA to write the servo information thereto. For example, the system typically includes: a contact member (not shown) which physically interfaces with the actuator assembly 120 via the apertures 136 (see FIG. 1); a position indicator (also not shown) which indicates the precise position of the contact member; and a displacing mechanism (also not shown) which moves the contact member in response to the position indicator. In order to precisely control the displacing mechanism, the position indicator is, in one embodiment, a model 10705A laser interferometer (also not shown) made by Hewlett-Packard. The interferometer uses the laser assembly 600 as its energy source.

Other conventional servo track writing system components are also possible. However, since the particular construction of these portions of the servo track writing system, including the hardware and electronics that are used to actually write the servo information to the disks, is not central to the present invention, it is not further discussed herein.

STW Operation

Having described an exemplary embodiment of the STW, attention is now focused on a method of securing the HDA in the STW in accordance with one embodiment of the present invention. The purpose of this description is to permit someone of skill in the art to practice the method. Accordingly, steps that are not critical or those that are well known in the art have been omitted for the sake of simplicity. The reader is also reminded that, while described in a particular order, steps may be rearranged to some degree to better accommodate particular manufacturing processes. In addition, steps may be modified to accommodate disc drives of different sizes and different configurations. And finally, although the method is described in terms of a single STW, other embodiments are also considered in which multi-unit arrays of STWs are created to accommodate high volume production.

Figure 10:
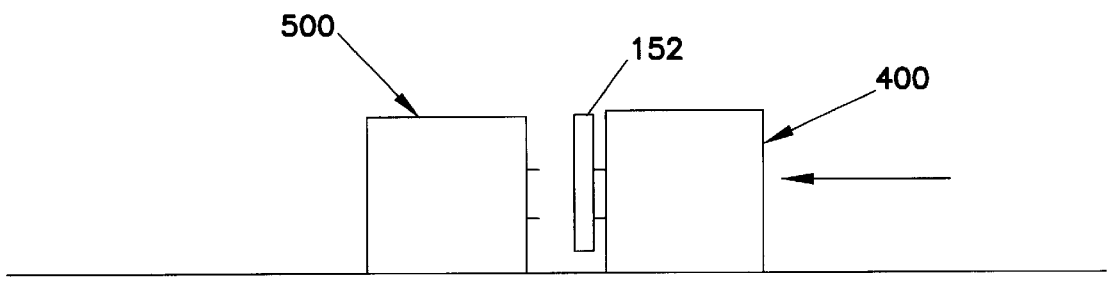
FIG. 10 is a diagrammatic view illustrating clamping of the HDA into the STW in accordance with one embodiment of the invention.
Figure 11:
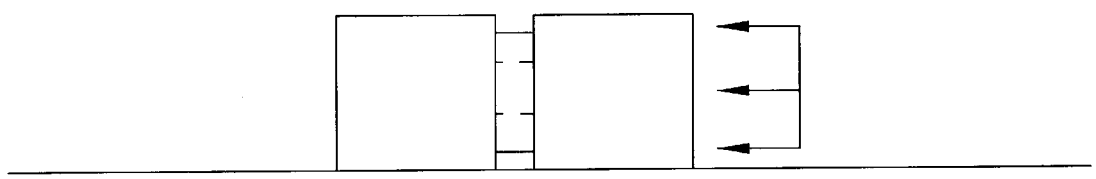
FIG. 11 is a diagrammatic view illustrating restraining the HDA within the STW in accordance with one embodiment of the invention.
Figure 12:
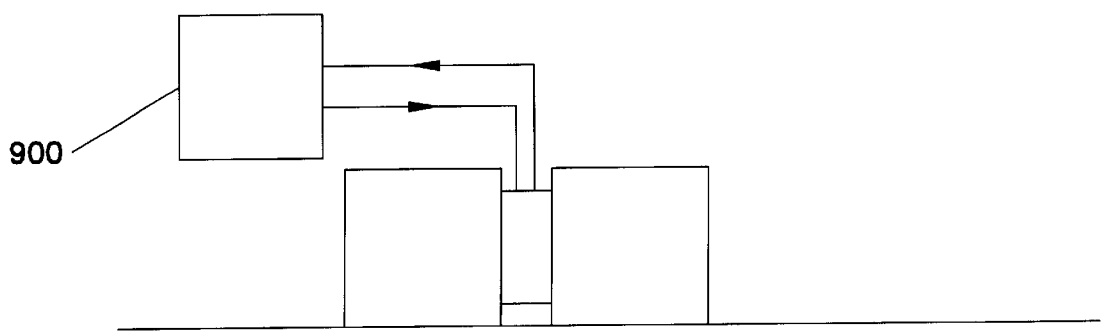
FIG. 12 is a diagrammatic view illustrating writing of servo information to the HDA in accordance with one embodiment of the invention.

Referring now to related FIGS. 9–12, the method, broadly speaking, comprises inserting the HDA 152 into the STW (FIG. 9) and clamping the HDA 152 between opposing clamp members (FIG. 10). The clamp members include opposing contact points which engage the ends of both the spindle shaft 138 and the pivot shaft 118 (see FIG. 13). Using a loading device such as the pneumatic cylinder 426, a compressive load is applied to the contact points, restraining the ends of the spindle and pivot shaft (FIG. 11). With the ends so constrained, the servo track writing process according to conventional methods is executed by a servo writing system 900 as diagrammatically represented in FIG. 12. By constraining the respective ends, relative motion between the spindle 133 and pivot shaft 118 is minimized during the track writing process, resulting in more concentric track formation and ultimately higher track densities. When clamped between the respective contact points, the compressive load is applied to stationary portions of the spindle shaft 138 and pivot shaft 118 such that rotation of the spindle and actuator assembly 120 are unrestrained.

The STW 200 described above and illustrated in FIGS. 2–8 is adapted to retain the HDA 152 according to the method described. In particular, with the STW in the "open" position (see FIG. 3), the HDA 152 is loaded into the basket 410 of the basket assembly 400. Automated or manual methods may be used to insert/remove the HDA into the basket. In one embodiment, an identifying device 800 (shown in FIG. 14) such as a bar code scanner identifies the HDA and adjusts relevant STW parameters (clamp load, disc capacity, etc.) prior to securing the HDA therein.

Figure 13:
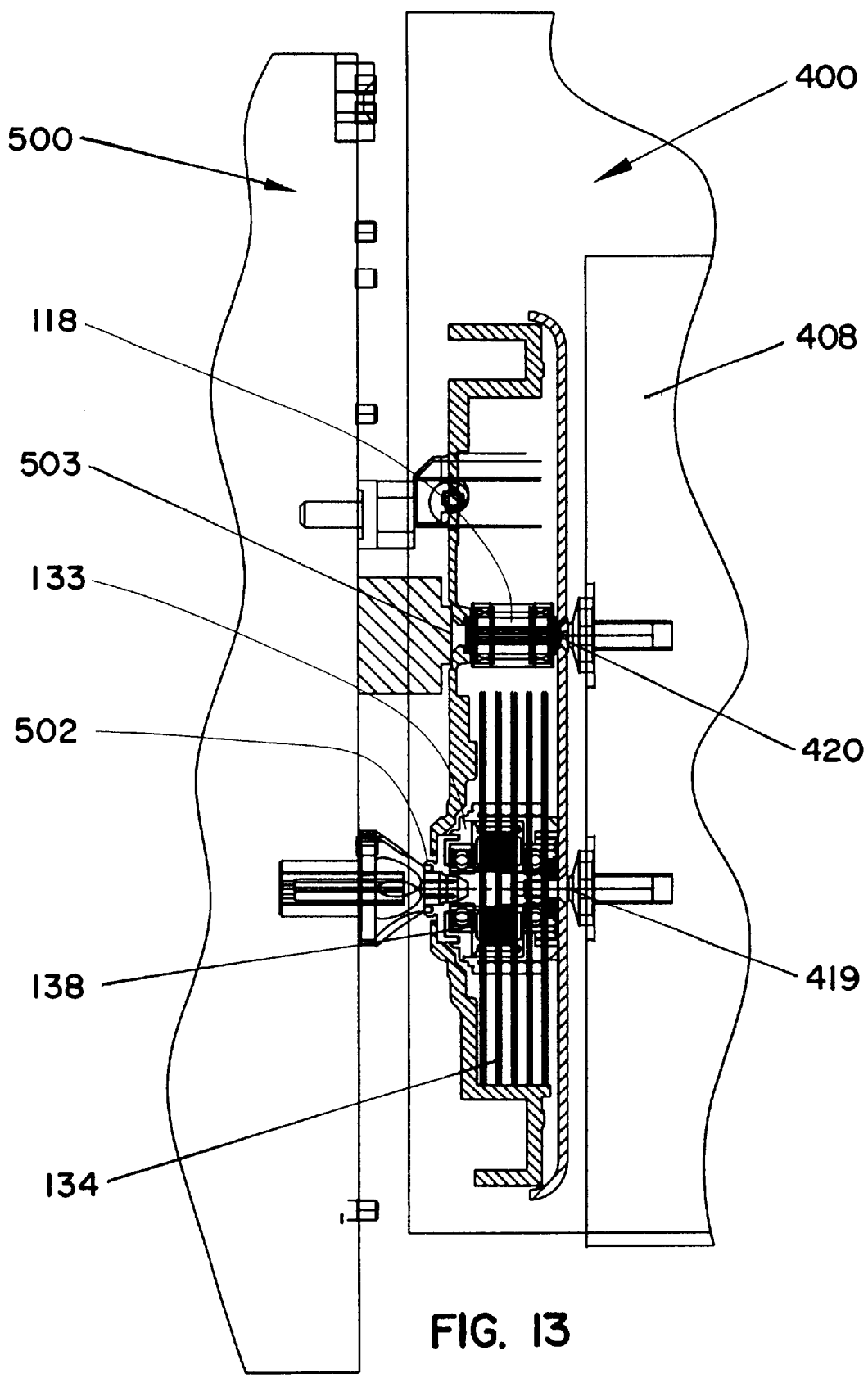
FIG. 13 is a diagrammatic section view showing the engagement of the HDA within the STW.

Once inserted, the contact points 419, 420 of the damper assembly 408 are adjacent to the second ends of the spindle shaft 138 and the pivot shaft 118 respectively. The carriage 402 with the HDA 152 therein is then moved to the closed position as shown in FIG. 2. To move the carriage, the pneumatic cylinder 424 pushes the carriage 402 toward the fixed block assembly 500. In order to reduce friction between the carriage 402 and the base 300, the air bearing 430 as described above is activated. The air bearing produces a thin air film between the carriage 402 and the surface 301. In one embodiment, the air film thickness is approximately 0.002 in (0.051 mm). The vacuum stiffener as described herein is used to preload the air bearing and maintain a consistent flying height. The retractable guide rollers 506 (see FIGS. 3 and 8) are extended from the side rail 504 and the side loading assembly 508 (see FIG. 8) is extended to confine the moving carriage, aligning the HDA 152 with the opposing contact points 502, 503 located on the fixed block assembly 500. The cylinder 424 then moves the carriage 402 towards the fixed block assembly 500. Additional guide members 512 (see FIG. 3) are provided to guide the HDA into correct position as the STW is closed. When the cylinder 424 has completely extended the carriage 402, the HDA 152 is located between the basket assembly 400 and the fixed block assembly 500 such that the spindle shaft 138 and pivot shaft 118 are sandwiched between the respective contact points 419, 420 502, and 503 as shown in FIG. 13. In one embodiment, the cylinder 424 is adapted for displacement and is capable of exerting only about 5 pounds (lbs) of force (22 Newtons) with a 85 psi (586 kPa) input from the pressurized air source 431.

At this point, the air supply to the air bearing orifices 432 is terminated, dropping the carriage 402 back to the base 300. The vacuum source, which was activated in conjunction with the air bearing 430 as previously described, continues to apply a partial vacuum to the recessed portion 438 (see FIG. 7). In one embodiment, the partial vacuum pressure is less than one inch Hg (25.4 mm Hg). With this partial vacuum maintained, the guide rollers 506 and the side loading assembly 508 are disengaged or drawn away from the carriage 402 and the second pneumatic cylinder 426 is pressurized, applying a predetermined load to the carriage 402 and thus, the spindle shaft 138 and pivot shaft 118. The partial vacuum maintains general alignment of the carriage yet still permits it to move and swivel to ensure even loading is maintained. In one embodiment, the load applied by the cylinder 426 is 150 lbs (667 Newtons). However, this may be adjusted to better accommodate the particular HDA 152. Once the load is applied, full vacuum pressure (approximately 28 in Hg or 711 mm Hg) is applied to the recessed portion to secure the carriage 402 to the base 300. In one embodiment, the cylinder 426 remains pressurized after full vacuum pressure is applied to ensure loading is maintained. In another embodiment, the actuator 426 is unloaded (i.e., pressure is no longer provided), leaving the vacuum coupling of the block 406 alone to function as the restraining means. Once again, other devices that can preload the HDA (electric ball screw for example) are also possible within the scope of the invention.

As the HDA is secured, electrical interconnection to the spindle motor, actuator assembly, and read/write circuitry is automatically or manually made. The STW can then initiate an otherwise conventional servo writing process based on the particular HDA model loaded therein. Because the pivot shaft 118 and spindle shaft 138 are restrained between two stiff structures, the respective axes of the two shafts remain substantially parallel throughout the writing process. Accordingly, non-repeatable movement of the actuator assembly 120 and the spindle 133 that is common with other STWs is minimized and higher track density is achieved.

Figure 14:
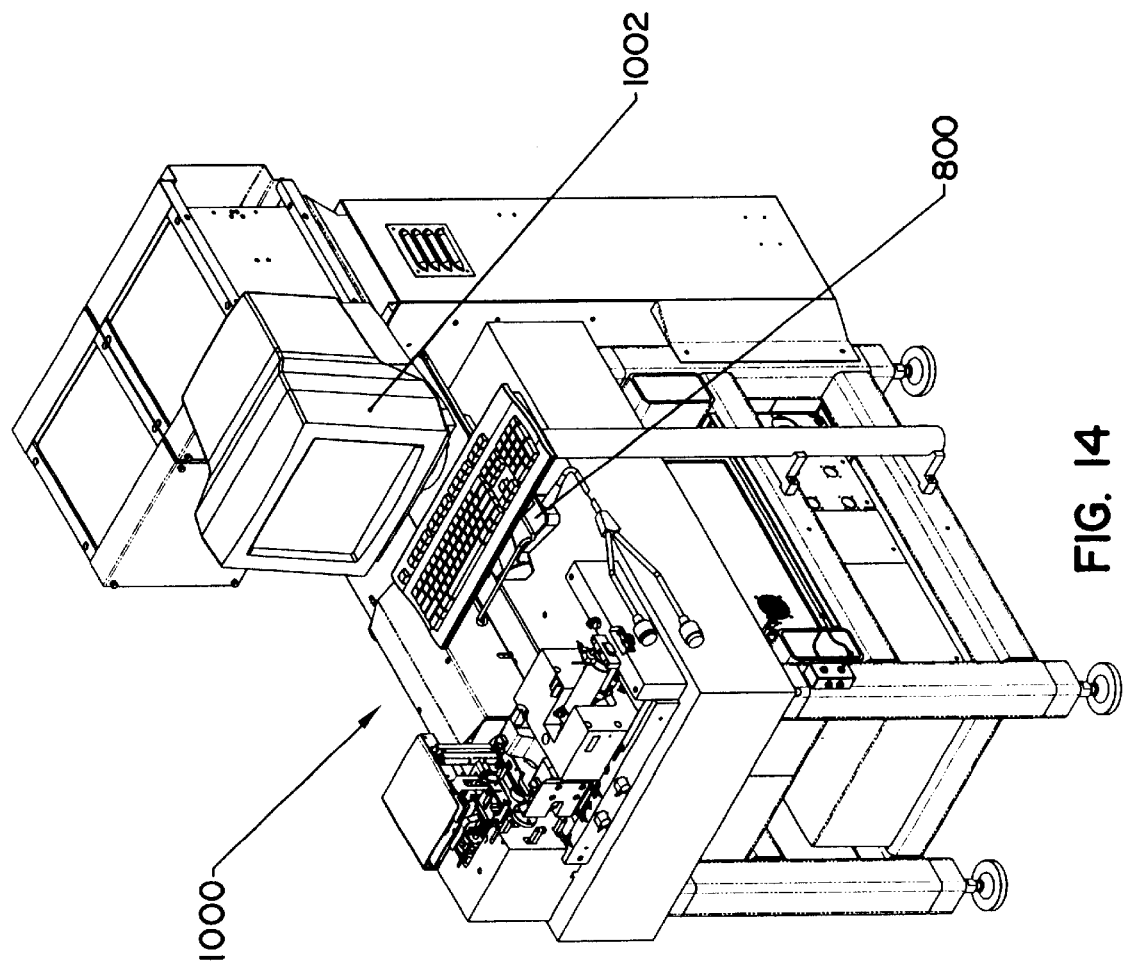
FIG. 14 is a perspective view of a servo track writing system according to one embodiment of the invention.

The STW 200 can be incorporated into a complete servo track writing station 1000 as shown in FIG. 14. In this particular embodiment, the station 1000 comprises the STW components discussed herein as well as a computer 1002 to monitor and control the process. Further, pneumatic and vacuum sources (not shown) may be included. Other equipment such as the scanner 800 (to identify HDAs for correct STW settings) may also be integrated into the station 1000. While the station 1000 is shown as a stand-alone unit, other embodiments wherein the STW is arrayed with other units sharing common equipment (e.g., one workstation, one pneumatic air supply, etc. controlling multiple STWs) are also possible without departing from the scope of the invention.

To address particular dynamic characteristics of the HDA and STW, variations in STW parameters and components may be made without departing from the scope of the invention. For example, the damper assembly 408 and fixed block assembly 500 may be made of a material that provides improved damping to the spindle shaft and pivot shaft. Alternatively, the force applied to the HDA by the pneumatic cylinder 426 may be elevated or reduced depending on the particular HDA. In another embodiment, a force measuring transducer may be used with the cylinder 426 to more precisely apply the compressive load. In still yet another embodiment, a pneumatic servo valve is used to maintain the applied load via a feedback signal from the load cell.

Advantageously, the present invention provides an STW having an air bearing and vacuum stiffener that permits precise movement of the vacuum block relative to a guide surface without the need for a second, opposing air bearing or similar preloading device. In addition, by operating the vacuum stiffener independently from the air bearing, the vacuum stiffener may also be used to vacuum couple the vacuum block to the guide surface, eliminating the need for a separate clamping device. Accordingly, the HDA may be loaded into and secured within the STW without manual operator intervention. The result is more accurate HDA placement and ultimately more efficient servo track writing.

Conclusion

In conclusion, a vacuum block 406 for use with a guide surface 301 is provided wherein the vacuum block 406 includes a vacuum stiffener 437 having a recessed portion 438 adapted to fluidly coupled to a vacuum source 435. The vacuum block 406 further includes an air bearing 430 extending around a periphery of the recessed portion 438 wherein the air bearing 430 is adapted to fluidly couple to a pressurized air source 431. In a first configuration, the vacuum source 435 and the pressurized air source 431 are activated simultaneously to elevate the vacuum block 406 from the guide surface 301 on an air film. In this configuration, the air bearing 430 is preloaded by the vacuum stiffener 437. In a second configuration, the pressurized air source 431 is deactivated to permit the vacuum stiffener 437 to vacuum couple the vacuum block 406 to the guide surface 301.

In another embodiment, a method for displacing and securing a vacuum block 406 relative to a guide surface 301 is disclosed. The method includes providing a vacuum block 406 wherein the vacuum block includes a vacuum stiffener 437. The vacuum stiffener has a recessed portion 438 adapted to fluidly coupled to a vacuum source 435. Also provided is an air bearing surface 422 extending around a periphery of the recessed portion 438, wherein the air bearing surface 422 is adapted to fluidly couple to a pressurized air source 431. The method further includes the step of activating the pressurized air source 431 wherein a bearing force is produced between the guide surface 301 and the air bearing surface 422 such that an air film develops therebetween. The vacuum source 435 is activated to a first vacuum pressure wherein the vacuum source 435 provides a preload force opposite the bearing force. Thereafter, the pressurized air source 431 is deactivated and the vacuum source 435 is maintained to vacuum-couple the vacuum block 406 to the guide surface 301 in a predetermined location.

In yet another embodiment, a servo track writing apparatus 200 for securing a head disc assembly (HDA) 152 during a servo track writing process is provided. The apparatus 200 includes a base 300, a fixed block assembly 500 attached to the base 300 and a basket assembly 400 opposing the fixed block assembly 500. The basket assembly 400 further includes a movable carriage 402 having a basket 410 adapted to receive the HDA 152, and a vacuum block 406 adapted to selectively permit both precise movement of the movable carriage 402 relative to the base 300 and to permit vacuum coupling of the movable carriage 402 thereto. The apparatus 200 also includes a displacing device 424 adapted for moving the carriage 402 toward the fixed block assembly 500 and a loading device 426 adapted for loading the carriage 402 against the fixed block assembly 500.

In still yet another embodiment, an apparatus for precisely locating a moving member 402 relative to a guide surface 301 in a servo track writer (STW) 200 is provided. The apparatus includes an air bearing 430 adapted to generate an air film 439 between the moving member 402 and the guide surface 301, and a device for stiffening the air bearing 430.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A servo track writing apparatus for securing a head disc assembly (HDA) during a servo track writing process, the apparatus comprising: a rigid base;
   a fixed block assembly attached to the base; and
   a basket assembly opposing the fixed block assembly wherein the basket assembly comprises:
      a movable carriage, the carriage having a basket adapted to receive the HDA and a rigid vacuum block adapted to selectively permit both precise movement of the movable carriage relative to the base and to permit vacuum coupling of the movable carriage thereto;
      a displacing device adapted for moving the carriage toward the fixed block assembly; and
      a loading device adapted for loading the carriage against the fixed block assembly.

2. The apparatus of claim 1 wherein the vacuum block further comprises an air bearing having at least one port fluidly coupled to a pressurized air source, the air bearing permitting relatively friction-free movement of the carriage relative to the base.

3. The apparatus of claim 2 wherein the pressurized air source is adjustable between a first bearing pressure and a second bearing pressure.

4. The apparatus of claim 3 wherein the first bearing pressure is approximately zero kPa and the second bearing pressure is approximately 586 kPa.

5. The apparatus of claim 2 wherein the air bearing further comprises an air bearing surface having an air distribution channel therein, the at least one port fluidly coupled to the air distribution channel.

6. The apparatus of claim 5 wherein the air bearing surface extends around a periphery of the vacuum block.

7. The apparatus of claim 5 wherein the vacuum block further comprises a vacuum stiffener having a recessed portion adjacent to the base, the recessed portion fluidly coupled to a vacuum source.

8. The apparatus of claim 7 wherein the recessed portion is substantially surrounded by the air bearing surface.

9. The apparatus of claim 7 wherein the vacuum source is adjustable between a first vacuum pressure and a second vacuum pressure.

10. The apparatus of claim 7 wherein the vacuum stiffener is operable simultaneously with the air bearing to preload the air bearing.

11. The apparatus of claim 7 wherein the vacuum stiffener is operable independent of the air bearing to permit vacuum coupling of the carriage to the base.

12. An apparatus for precisely locating a moving member relative to a guide surface in a servo track writer (STW), the apparatus comprising:

an air bearing adapted to generate an air film between the moving member and the guide surface; and means for stiffening the air bearing.

* * * * *